United States Patent [19]
Diebel et al.

[11] Patent Number: 5,010,502
[45] Date of Patent: Apr. 23, 1991

[54] METHOD AND APPARATUS FOR GENERATING REPRESENTATIONS OF 3-DIMENSIONAL OBJECTS

[75] Inventors: Heinz Diebel, Boeblingen; Ralf Peterhoff, Weil im Schoenbuch; Evelyn Thuemling, Boeblingen, all of Fed. Rep. of Germany

[73] Assignee: Hewlett-Packard Company, Palo Alto, Calif.

[21] Appl. No.: 494,921

[22] Filed: Mar. 13, 1990

Related U.S. Application Data

[63] Continuation of Ser. No. 58,487, Jun. 5, 1987, abandoned.

[30] Foreign Application Priority Data

Jun. 7, 1986 [DE] Fed. Rep. of Germany ..... 86107786

[51] Int. Cl.$^5$ ............................................. G06F 15/60
[52] U.S. Cl. .................................. 364/522; 364/474.24
[58] Field of Search ............... 364/512, 518, 521, 522, 364/188, 191, 192, 194, 474.22, 474.23, 474.24; 340/706, 723

[56] References Cited

U.S. PATENT DOCUMENTS

| | | | |
|---|---|---|---|
| 4,549,275 | 10/1985 | Sukonick | 364/518 X |
| 4,586,145 | 4/1986 | Bracewell et al. | 364/512 |
| 4,641,270 | 2/1987 | Lalloz et al. | 364/194 X |
| 4,721,952 | 1/1988 | Huber | 340/706 X |
| 4,736,306 | 4/1988 | Christensen et al. | 364/522 X |

Primary Examiner—Dale M. Shaw
Assistant Examiner—Mark K. Zimmerman

[57] ABSTRACT

A computer aided design (CAD) system has the capability of operating in either a 2D or a 3D mode. In 2D mode, the system uses only instructions contained in a 2D instruction memory and executes only instructions relating to 2D geometry. Upon receipt of a command relating to 3D geometry, the system performs a 2D to 3D transformation, performs a topolgy check, transfers control to a 3D instruction memory and performs instructions relating to 3D geometry.

5 Claims, 11 Drawing Sheets

METHOD AND APPARATUS FOR GENERATING REPRESENTATIONS OF 3-DIMENSIONAL OBJECTS

CROSS REFERENCE TO RELATED APPLICATION

This application is a continuation, of application Ser. No. 058,487, filed June 5, 1987, now abandoned.

BACKGROUND AND SUMMARY OF THE INVENTION

This invention relates to a method and apparatus for generating representations of three dimensional objects, e.g., mechanical parts, in a computer aided design (CAD) system.

Prior art CAD systems have generally been either two dimension (2D) systems, which are based on two dimensional geometry, or three dimension (3D) systems, which are based on three dimensional geometry. 3D-systems have advantages over 2D-systems in that they allow three dimensional topological checks, perspective and shaded views, and three dimensional model manipulation.

3D systems typically may be either wire frame systems, surface systems or solid modeling systems. In a wire frame system the three dimensional geometry of an object is described only in lines defining the object edges. This description allows compact data structure and fast system response. Unfortunately, wire frame systems allow only incomplete topological checks with the result that an invalid geometry may be defined.

In 3D surface systems, descriptions are based on a wire frame system with the additional ability to handle information about object surfaces. Unfortunately, surface systems have the same limited ability to perform topological checks as do wire frame systems.

In 3D solid modeling systems, complex algorithms are used to allow complete three dimensional topological checks so that a valid geometry can always be maintained. Unfortunately, this results in very slow system response especially when three dimensional object topology is checked.

In accordance with the illustrated preferred embodiments of the present invention, a CAD system has an improved and simplified user interface while also retaining the major advantages of the three types of 3D systems. In the preferred embodiments, a CAD system includes a processor which is connected through various registers to one or more user input devices such as keyboards or graphics tablets. The processor is also connected to at least one user display device such as a graphics CRT screen.

In accordance with the preferred embodiments, the CAD system has the ability to operate in either a 2D mode or in a 3D mode. In the 2D mode, the processor only accepts and processes commands relating to the two dimensional geometry of an object in a given plane and has access to a 2D memory. In this mode, the processor operates under control of instructions contained in a 2D instruction memory.

In the event that a command is entered that relates to the 3D geometry of the object, processor control is transferred to a transformation instruction memory. Transformation instructions cause the processor to transform the 2D geometry into a corresponding 3D geometry. Control is then transferred to a 3D instruction memory to allow the processor to operate based upon a 3D geometry while having access to a 3D memory.

The preferred embodiments combine the ease of use and fast response times of 2D CAD systems with the three dimensional capabilities of 3D CAD systems. In 2D mode, design procedures are performed under control of instructions contained in the 2D instruction memory and the user interacts with the system as if it were a 2D system. In particular, only commands and data that relate to the 2D geometry of a specific plane (the "work plane") may be entered. Typically, the work plane is displayed on the user's graphics screen.

In the 2D mode, instructions from an existing 2D system can be stored in the 2D instruction memory or an existing 2D instruction memory may be useable. If, as may be the case, the user is experienced only in prior 2D systems, user familiarization is easily accomplished on the system since no new commands or procedures are necessary. In addition, while in 2D mode the system performs functions and procedures on a 2D basis with the result that very fast response times are possible.

In contrast to prior art systems, the system in accordance with the preferred embodiments is also capable of receiving commands that affect the 3D geometry of the object to be displayed. For example, the user can enter a command to create a solid object from a 2D profile by the use of an extrusion operation. Other 3D operations could mill a hole with a given 2D profile or stamp 2D profiles through existing 3D objects. Since these operations cannot be performed in the work plane under control of the 2D instructions, the following operations are performed. First, the 2D mode geometry is transformed into a corresponding 3D geometry. Then, control is passed from the 2D instruction memory to a 3D instruction memory. In one preferred embodiment of the present invention a topological check is perfomed on the object to ensure, for example, that no intersections or branches of geometric components occur.

In prior art 3D systems such topological checks are often unsatisfactory. In wire frame or surface systems invalid geometries may result and topological checks in solid modeling systems can be very time consuming. The preferred embodiment avoids both of these problems of the prior art. In the preferred embodiment, the topological check is complete and no invalid geometries can be defined. In addition, the topological check is only performed when a 3D command is received with the result that only a minimal slow down of the system is caused. This differs from prior art solid modeling systems in which topological checks are performed every time that a new geometric element is added to the object. Furthermore, slow downs are minimized since topological checks can be performed on a 2D basis.

When a 3D command is received and the transformation instructions are completed, control is passed to the 3D instruction memory. Under control of the 3D instructions, the processor stores the 3D geometry in a 3D memory. Control is then transferred back to the 2D instruction memory so that the user can continue to enter commands.

Thus, in accordance with the preferred embodiments, 3D operations are performed only when necessary. At all other times, operation is performed on the two dimensional work plane.

In accordance with another preferred embodiment of the present invention, the user has the additional ability to select any of a number of views for display. Upon transfer of control to the 3D instruction memory, the processor creates a three dimensional view of the object and stores it in the 2D memory. In a like manner, views in 2D planes other than the work plane (such as a ninety degree rotation) can be created under control of the 3D instruction memory and stored in the 2D memory. Upon selection by the user these specific views can be shown on the display by access to the 2D memory. In this case, the views are only updated each time control is transferred to the 3D instruction memory by the transformation instruction memory.

If the user creates views of other planes in 3D mode, these planes can be defined as new work planes for use in 2D mode. In addition, the user can define a new work plane which may lie at an angle to the original work plane. This capability is often useful if the object has a sloping surface which is definable as the new work plane so that all functions and operations can be performed on this surface in 2D mode.

In another preferred embodiment of the present invention, the user can directly access the 3D instruction memory. This may be useful, for example, to call up pre-defined objects, such as blocks, cones, cubes, cylinders or spheres. Direct access to the 3D instruction memory additionally may allow other operations such as Boolean operations. Even direct modification of the object in 3D mode could be possible.

In accordance with the preferred embodiments, the 3D instructions can be based on any of the prior art types of 3D systems. It is often the case that solid modelling system instructions are preferred.

DETAILED DESCRIPTION OF THE PREFERRED EMBODIMENT

Figure 1:
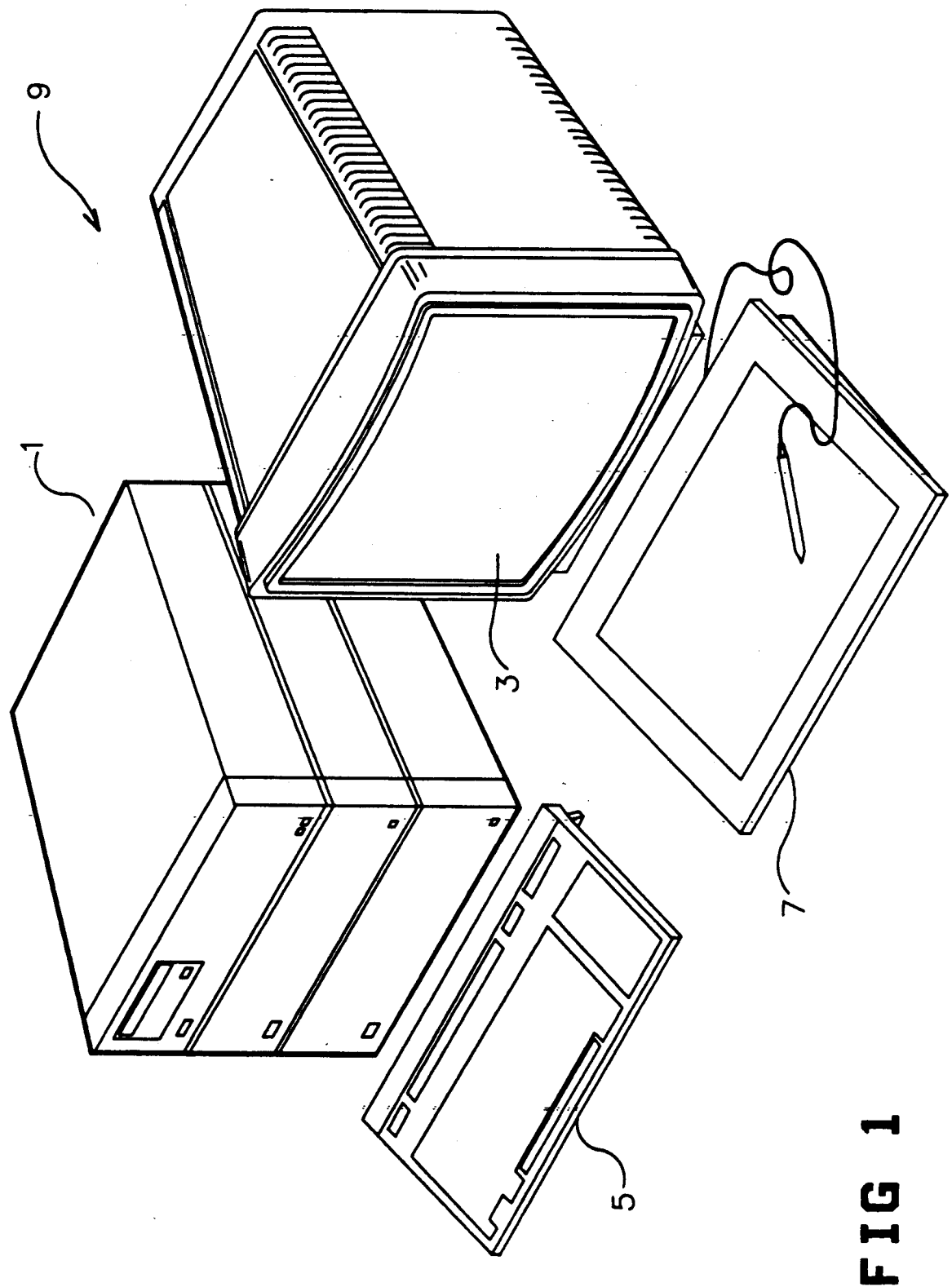
FIG. 1 shows a CAD system that is constructed in accordance with a preferred embodiment of the present invention.

FIG. 1 shows a CAD system 9 which includes a computer 1 connected to a CRT display 3. For best display of created objects, display 3 may include a high resolution color graphics screen. The computer 1 is also connected to a keyboard 5 which may be used to enter alphanumeric text or numerical dimensions. Computer 1 is further connected to a graphics tablet 7 for the entry of geometric structures and, as discussed below, commands. The commands could be entered through the keyboard 5 and the graphics tablet 7 could be replaced by, e.g., a "mouse" or a light pen.

Figure 2:
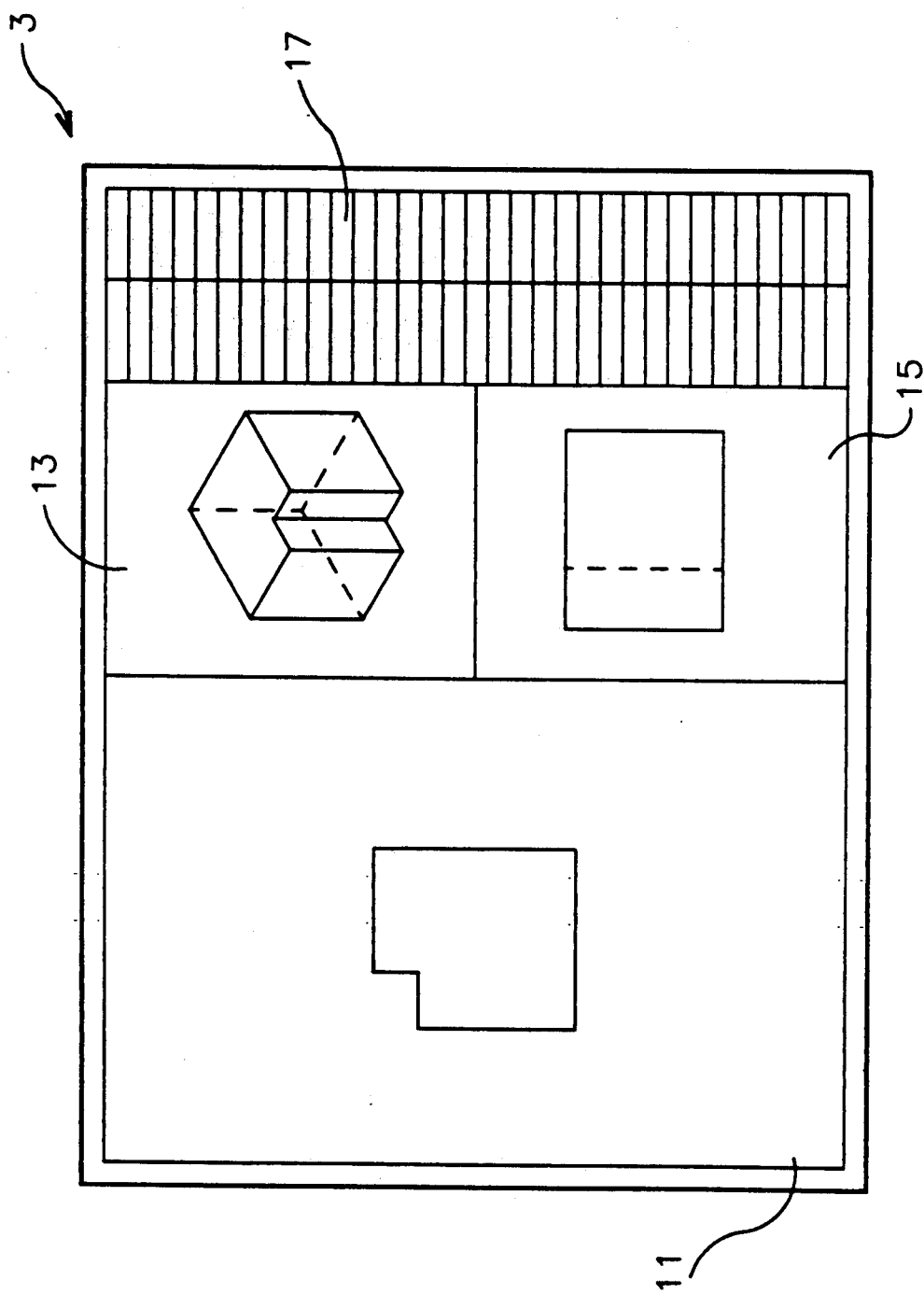
FIG. 2 shows a screen display presented by the CAD system shown in FIG. 1.

FIG. 2 shows an example of the output shown on the display 3. The user edits objects in the work plane which is depicted on display 3 as area 11. All inputs and definitions are performed by the user in the work plane and area 11 shows the actual 2D plane and the geometric structure defined in the work plane by the user in 2D mode.

The display 3 shows two additional view areas which are labelled areas 13, 15. In these two areas, the user can select other 2D views of the object, as shown in area 15, or perspective views of the object, as shown in area 13. As explained below, these views are only created and updated in the 3D mode. Input commands are displayed in a command area 17. By moving a pencil to an appropriate area on the graphics tablet 7, the user can select a command offered in area 17.

Figure 3:
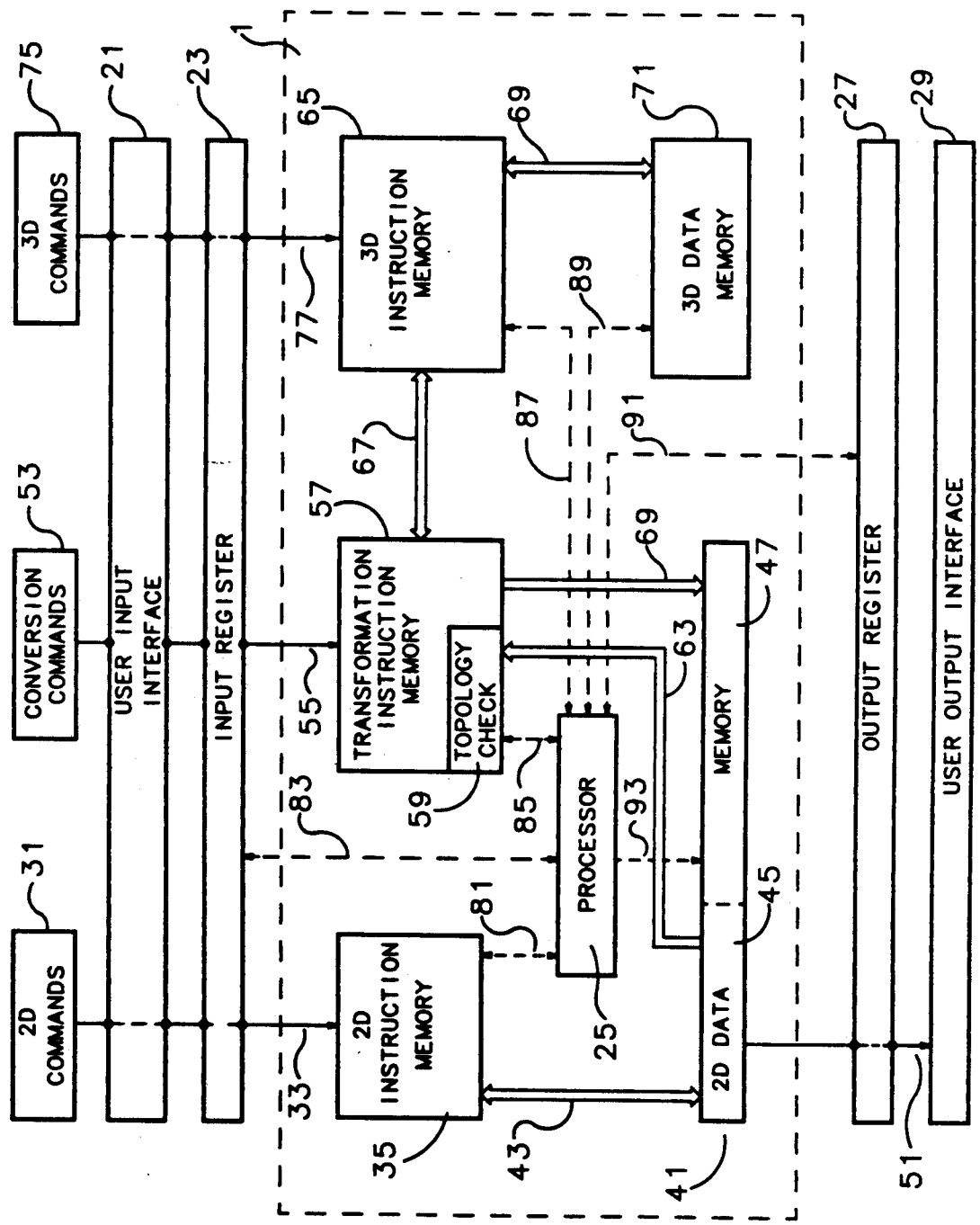
FIG. 3 is a block diagram of the CAD system shown in FIG. 1.

FIG. 3 shows a block diagram with a user input interface 21. This interface 21 includes components to allow communication from the user to the CAD system. As shown in FIG. 1, interface 21 includes keyboard 5 and graphics tablet 7. In other implementations, the interface 21 may include a mouse or a light pen. The interface 21 may be used for any inputs desired by the user such as command inputs concerning the geometry of the object to be defined. These commands may be divided into three groups as discussed below. The commands are transferred via an input register 23 to a processor 25. The processor 25, and various other components, is a part of the computer 1 which is shown by dashed lines in FIG. 3.

The CAD system 9 is also equipped with an output register 27 connected to a user output interface 29. This interface 29 is used to transmit information from the CAD system 9 to the user and may comprise the display 3 shown in FIG. 1.

The CAD system 9 includes three separate processing paths. When a command is entered relating to the two dimensional geometry of an object (a 2D command as shown in block 31) via path 33 to the CAD system 9, control is transferred to a 2D instruction memory 35. The processor 10 then executes the instructions contained in memory 35 and operates in 2D mode. In this 2D mode, all procedures relating to geometry are processed in the two dimensional work plane defined by the user. The instructions contained in the 2D instruction memory 35 can be, for example, instructions known in prior art 2D CAD systems.

While in 2D mode, information about the geometry of the object is stored in, and retrieved from, a 2D data memory 41 via line 43. Memory 41 includes part 45, containing geometric information which can be modified by the user, and a part 47 to which the user has no direct access. Any geometric information created in 2D mode is stored in part 45 of memory 41 so that the user has full control over the stored information. Any information to be displayed or shown to the user is transmitted via output register 27 to the user output interface 29 as shown by path 51.

A second type of input commands, conversion commands, are indicated by block 53. Conversion commands affect the three dimensional geometry of the object. Conversion commands could include, for example, commands to stamp a 2D profile through an existing 3D object, to mill an existing 3D object, to create a solid object from a 2D profile by an extrusion operation or to create a solid object from a 2D profile by rotation about an axis outside the 2D profile. Entry of a conversion command to the CAD system 9 on path 55 causes control to be transferred to a transformation instruction memory 57.

The transformation instruction memory 57 receives geometric information about the object from part 45 of 2D data memory 41 as indicated by path 63. The transformation instruction memory 57 contains instructions for a topological check as indicated by reference number 59. Under control of these instructions the object is checked for geometric completeness. This topological check can be performed on a 2D basis since 3D geometric validity can be guaranteed if the 2D topological check is performed and if a valid conversion procedure is performed on the 2D profile.

Once the topological check is completed successfully, the 2D profile is transformed to a 3D object according to the entered conversion command. After the transformation is complete, control is transferred to a 3D instruction memory 65 as indicated by numeral 67. This 3D instruction memory 65 has access (as indicated by numeral 69) to a 3D data memory 71. All information concerning the three dimensional geometry of the object is stored in, and retrieved from, memory 71. All procedures related to the three dimensional geometry of the object are executed under control of the 3D instruction memory 65. From the 3D data memory 71, perspective views of the object can be created and stored in part 47 of 2D data memory 41. For creation of a perspective view control is transferred to transformation instruction memory 57 which has access to part 47 of 2D data memory 41 as indicated by numeral 69. The 3D geometry information can also be used to create two dimensional views of the object in planes other than the current work plane. In this case, control is also transferred from the 3D instruction memory 65 to transformation instruction memory 57. Instructions contained in the memory 57 allow creation of the two dimensional view and storage in part 47 of the 2D data memory 41.

The 2D topological check performed upon transformation of a 2D profile to a 3D object has the advantage of being based only on a 2D geometry. Because of this, the check is easier and less time consuming to perform than a full 3D topological check would be. Furthermore, the topological check need only be performed when control is transferred to transformation instruction memory 57. A topological check is not necessary every time that the user adds new geometric elements as is necessary in prior art 3D systems.

Since the work plane is user definable, the user can change the definition during the design of an object. For example, the user could define a two-dimensional view shown in area 15 of FIG. 2 as a new work plane so that editing in this plane would be possible. An important feature of the present invention is the ability to define sloping or even curved surfaces as a work plane. With such a definition, 2D inputs are possible with reference to this sloping or curved plane.

The CAD system 9 also has the capability, as shown in block 75 and path 77, for the entry of 3D commands which relate to 3D geometry. These commands could include, for example, the retrieval of stored geometric objects (known as primitives) such as blocks, cones, cubes, cylinders or spheres. These commands could also include Boolean operations for the combination, e.g., union, of existing 3D objects. For the execution of 3D commands, control is transferred directly to the 3D instruction memory 65 which has access to 3D data memory 71.

All operations performed by the CAD system 9 are performed under control of the processor 25. The processor 25 has access to all memories and registers as indicated by numerals 81-93.

Figure 4:
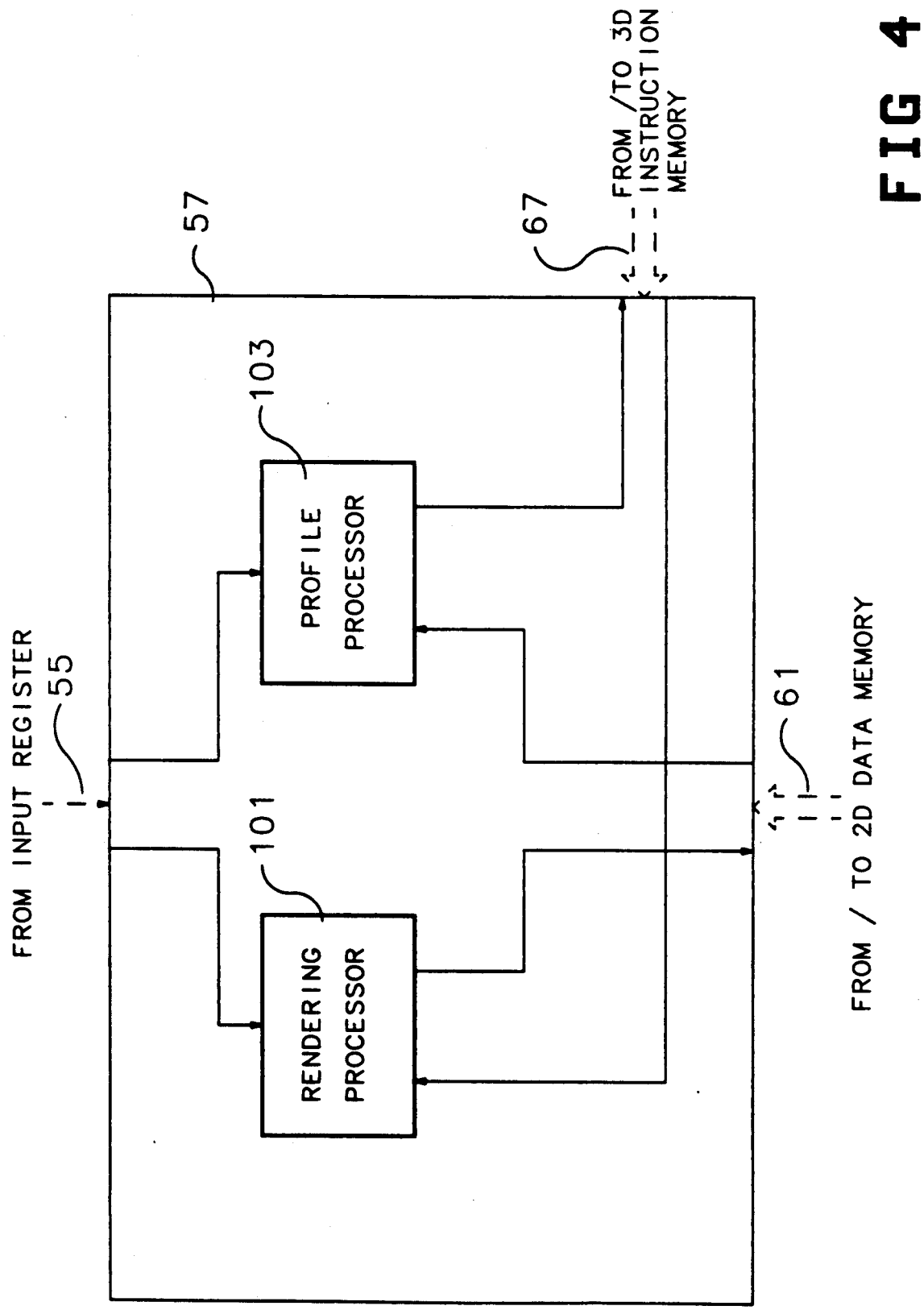
FIG. 4 is a detail view of a portion of the block diagram of FIG. 3.

FIG. 4 is a detailed view of the transformation instruction memory 57. The transformation instruction memory 57 includes one set of instructions called a rendering processor 101 and another set of instructions called a profile processor 103. The profile processor 103 is responsible for the transformation of a 2D profile into a 3D object, including the topology check, as shown by the arrows in FIG. 4. The rendering processor 101 is responsible for the retrieval of 3D geometry information and the creation of 2D views of planes other than the work plane, as indicated by area 15 of FIG. 2. Thus, the transformation instruction memory 57 operates in a bi-directional manner to cause 2D to 3D and 3D to 2D transformations.

Figure 5:
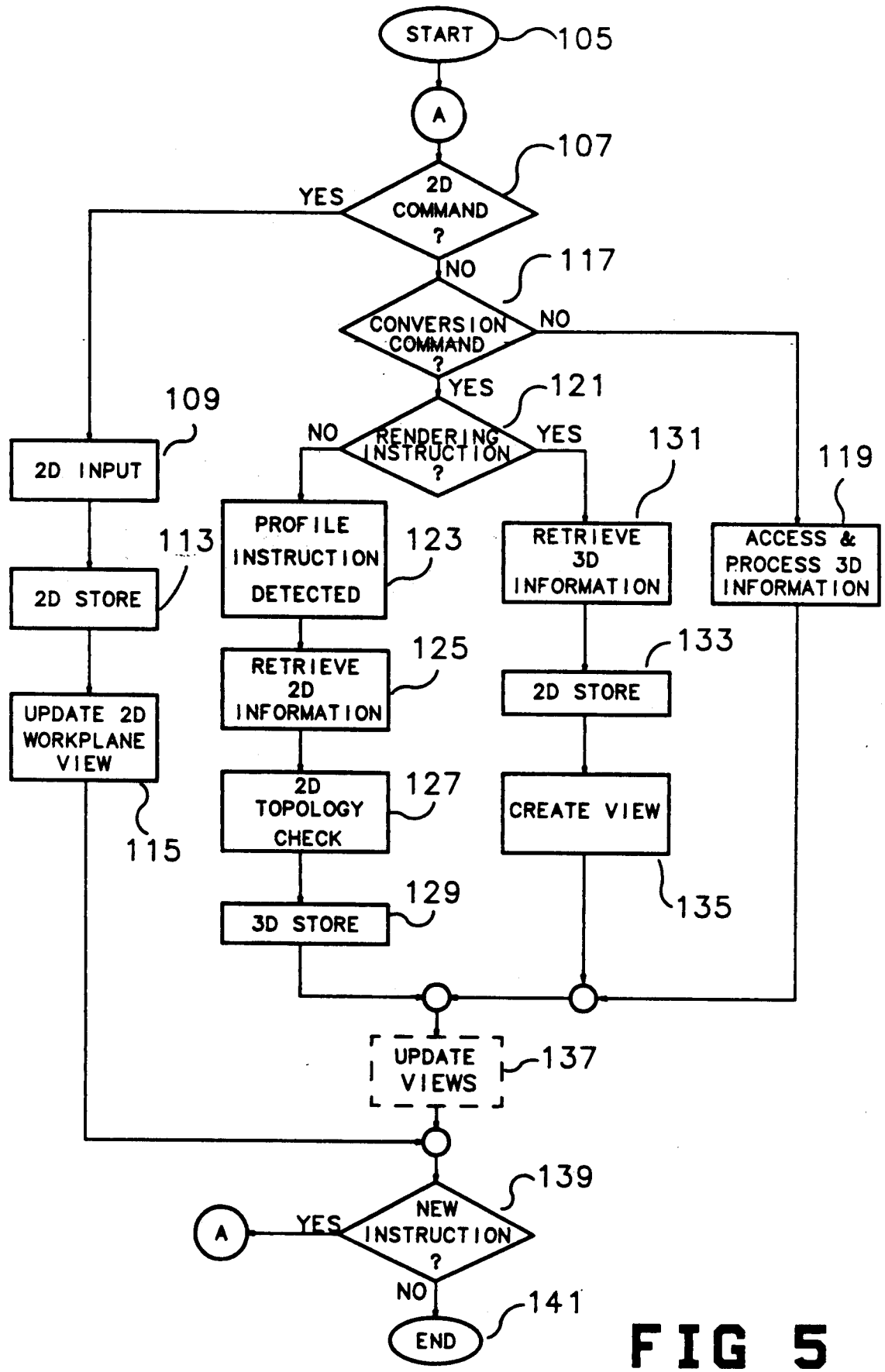
FIG. 5 is a flow chart of steps performed by the CAD system shown in FIG. 1.

FIG. 5 is a general flow chart of the operation of the processor 25. Upon the entry by the user of a command, the CAD system 9 begins operation at step 105. In step 107, an initial check is performed to determine if the entered command is a command relating to 2D geometry. If the entered command is a 2D command, at step 109 the system 9 accepts it as a 2D input and, at step 113, stores the related information in the 2D data memory 41. At step 115, the system 9 then updates the displayed 2D work plane.

If the entered command is not a 2D command, at step 117 the system 9 further checks whether this command is a conversion command. If the command is not a conversion command, then the command is directly related to 3D geometry and 3D information is directly accessed and processed at step 119. If the command is a conversion command, then, at step 121, the system 9 determines if the command is a rendering instruction or not. If not a rendering instruction, at step 123 control is transferred to profile processor 103 of FIG. 4. Information is then retrieved, at step 125, from the 2D data memory 41 and the retrieved information is checked, at step 127, with reference to its 2D topology. The obtained geometry is then stored, at step 129, to the 3D data memory 71 under control of the 3D instruction memory 65. If the command is a rendering instruction, control is transferred to the rendering processor 101 of FIG. 4. In step 131, 3D geometry information is retrieved from the 3D data memory 71 and in steps 133, 135, this information is transformed into a 2D view and stored in the 2D memory 41. Finally, in step 135 a view is created.

If the entered command was a conversion command, the view is updated in step 137 as shown in areas 13, 15 of FIG. 2. This view update is performed only after entry of a conversion or 3D command and not in the case of a 2D procedure. In step 139, the system 9 waits for a new instruction. If a new instruction is received, operation returns to step 105. Otherwise, operation is completed at step 141.

Figure 6:
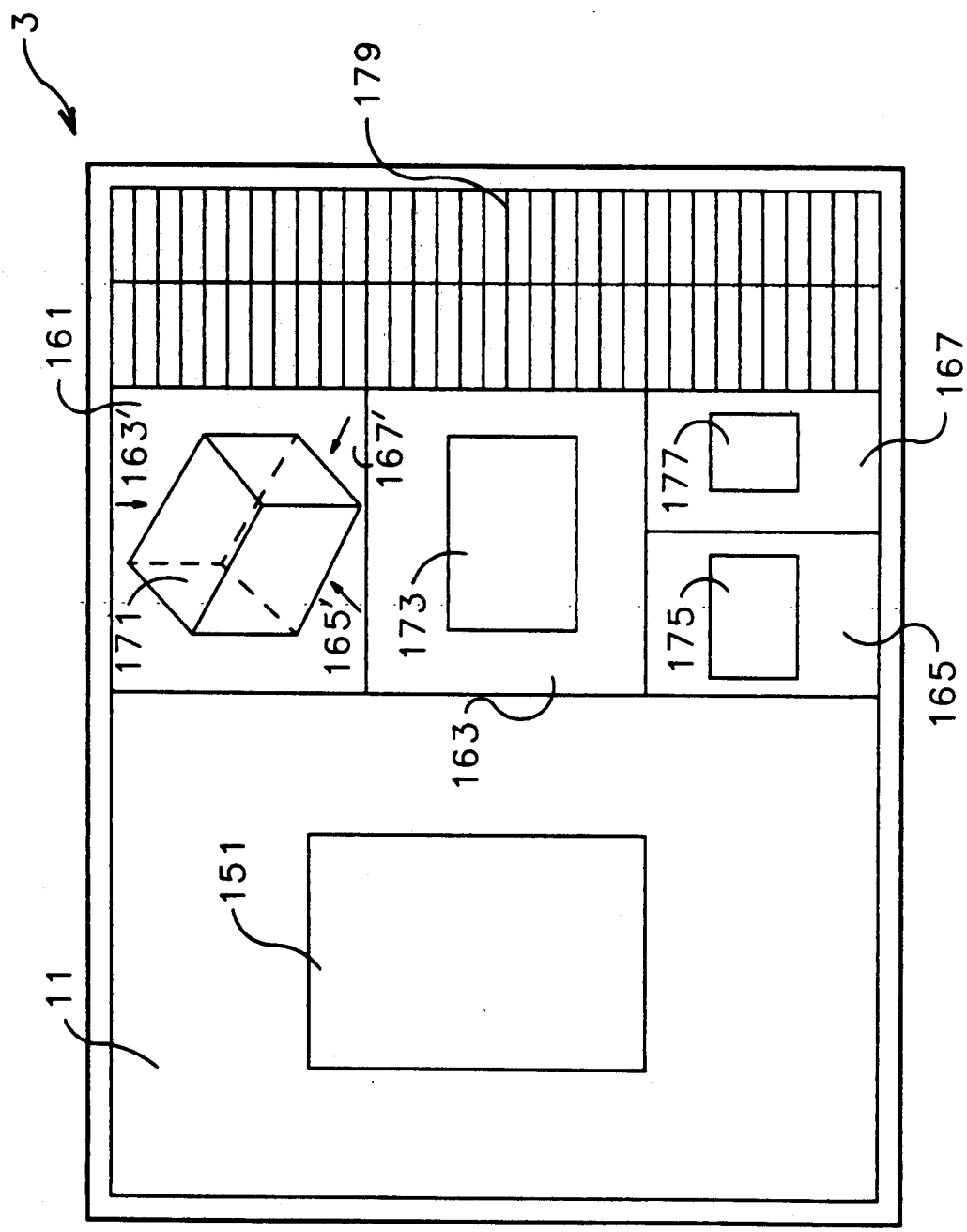
FIGS. 6–11 depict screen displays of the CAD system shown in FIG. 1 during creation of an object representation.

FIGS. 6-11 show various display representations during the creation of an object using the system 9. FIG. 6 shows the display 3 divided into its several parts. In area 11 the user can define a 2-dimensional geometry, such as a rectangle 151, according to the present work plane. In this example, the user defined a rectangle 151 and then initiated a LIFT operation. The command LIFT is a conversion command which passes control to the transformation instruction memory 57. Under control of memory 57, a topological check of rectangle 151 is performed in 2D geometry. This topological check ensures that both the 2D and 3D geometries are valid. A transformation was then performed into 3D and the resulting parallelepiped block was created.

In areas 161-167 (corresponding to areas 13, 15 of FIG. 2) the user has defined a number of views of the object. These views were stored in area 47 of 2D data memory 41 under control of the transformation instruction memory 57 and were then displayed on the display 3. Area 161 depicts a perspective view of the parallelepiped block 171. In areas 163-167, 2D outside views 173-177 of the created block 171 are shown. The view directions are indicated at block 171 by reference numerals 163'-167'.

A special area 179 of the display 3 serves as a command input area in which the user can select different commands by moving a pen to an appropriate position on the graphics tablet 7 in a conventional manner.

Figure 7:
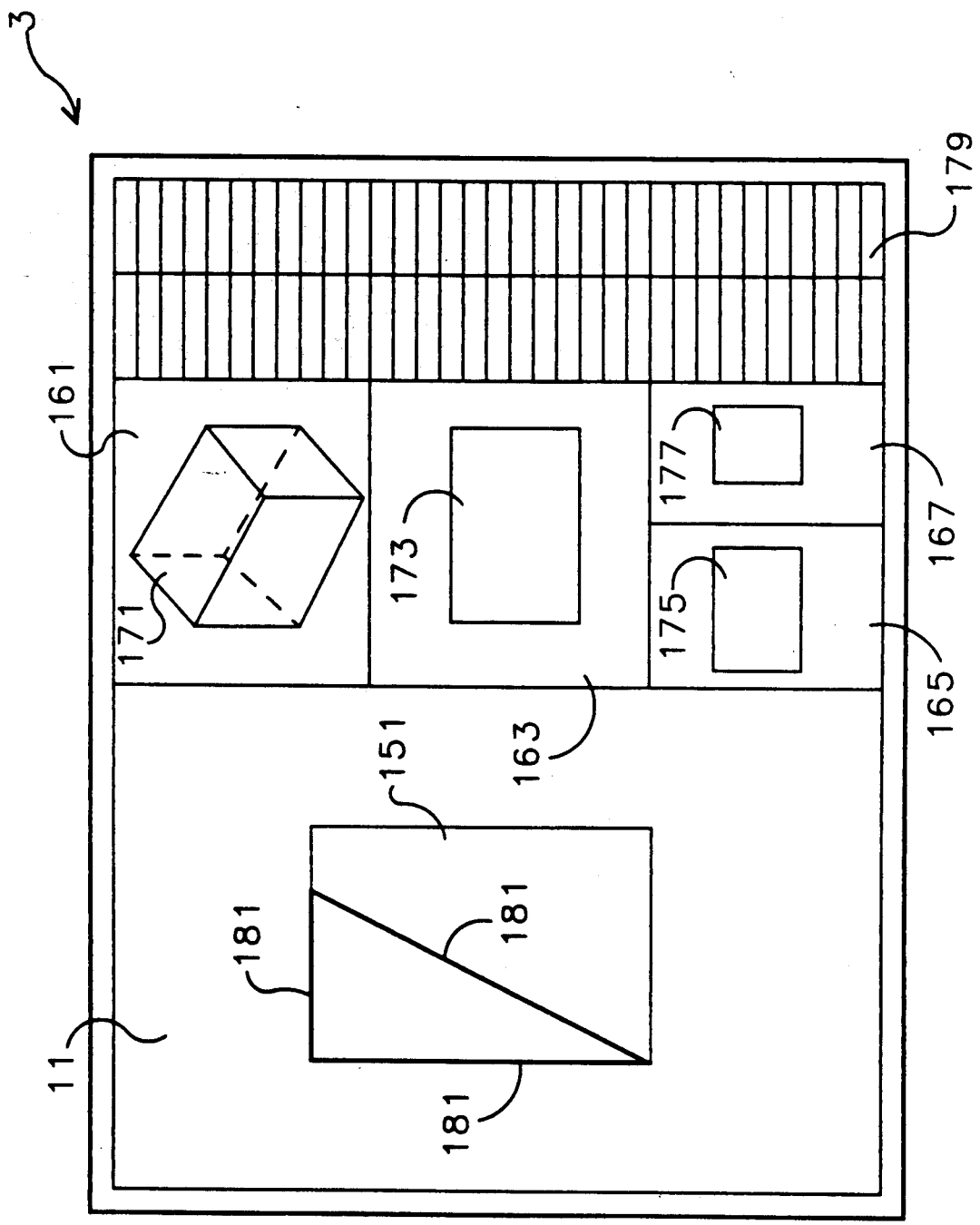

FIG. 7 shows the display 3 at a point at which the user has added a triangle 181 to the structure in the work plane. This operation is performed in 2D mode under control of the 2D instruction memory 35. Views 161-167 do not change since neither the transformation instruction memory 57 nor the 3D instruction memory 65 control this operation.

Figure 8:
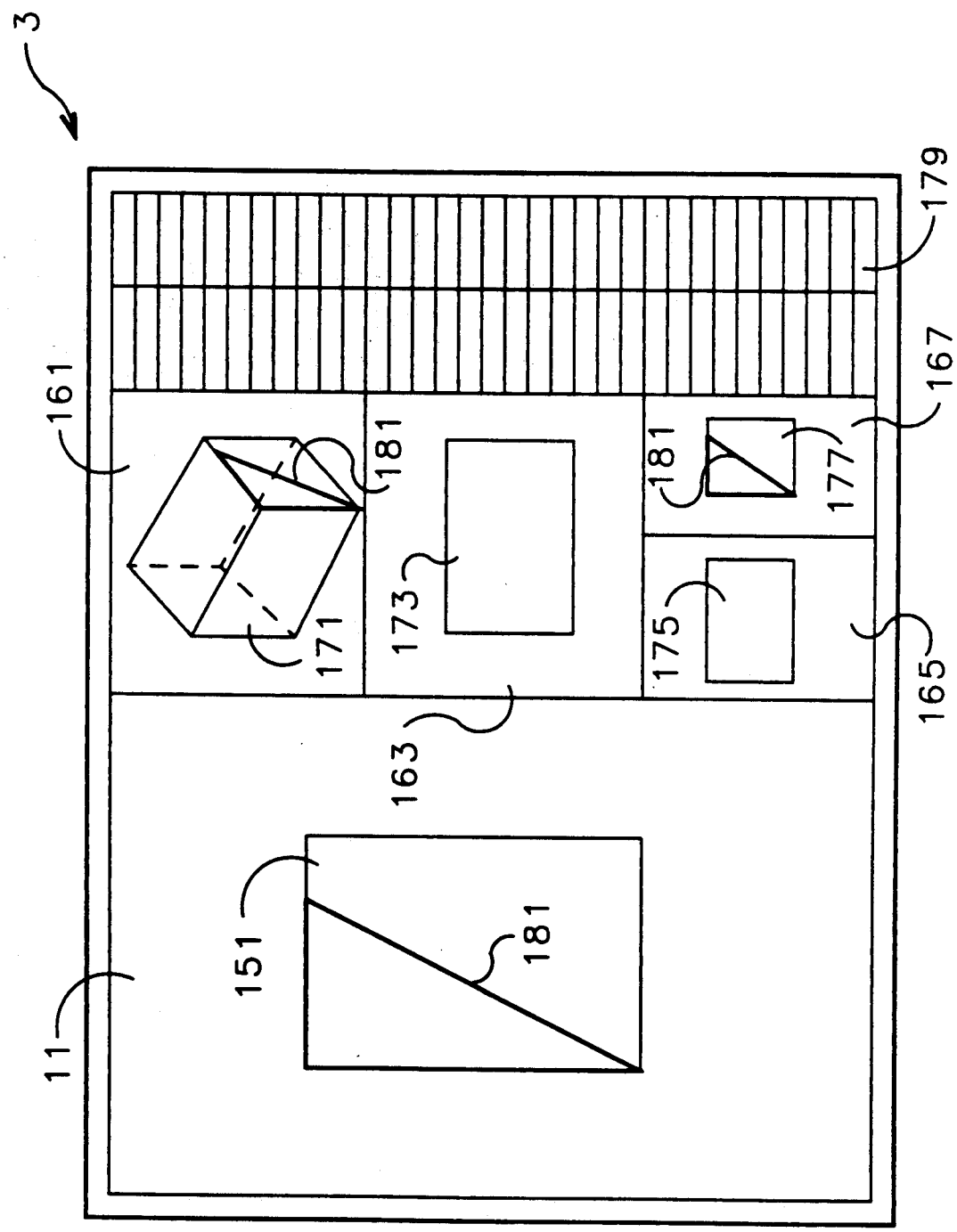

In the example shown in FIGS. 6-11, the user elected to initiate a MILL operation after defining triangle 181. This MILL operation is a conversion command which causes the system to perform a topological check on the 2D geometry defined in the work plane. After having passed this check, the 2D geometry is transformed to a 3D geometry under control of the transformation instruction memory 57. The resulting 3D information is handled by the 3D instruction memory 65 and stored in the 3D data memory 71. After this operation, the views are updated and restored in the 2D data memory 41. Changes to the 3D geometry are shown in areas 161-167 of FIG. 8. Line 181 is also shown in FIG. 8.

Figure 9:
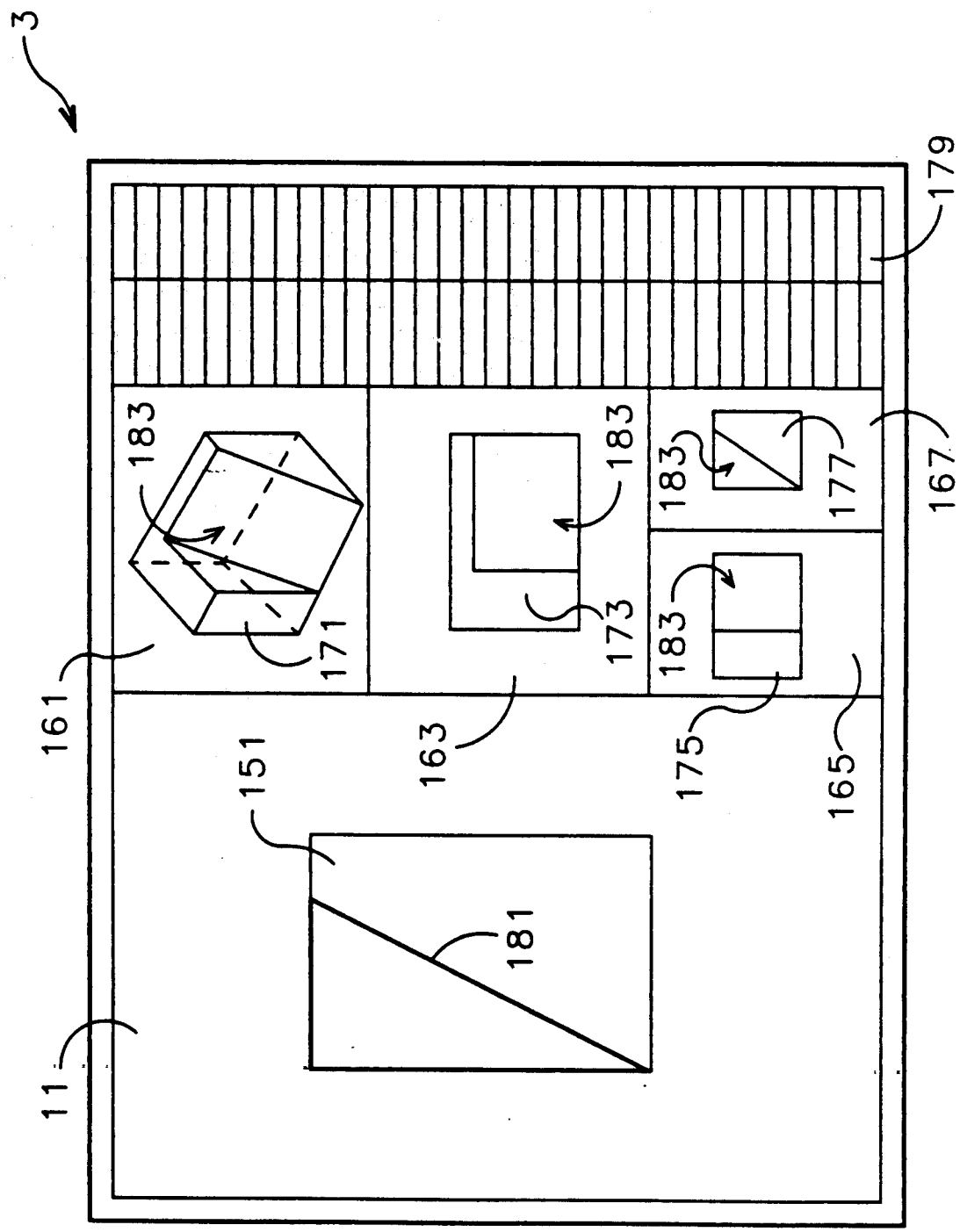

After performing this operation, the system 9 prompts the user for the depth of the MILL operation. The system 9 performs the MILL operation in 3D mode using depth information entered via the keyboard 5 by the user. The system 9 then updates the views as shown in FIG. 9 to depict the result of the MILL operation as an outbreak 183.

Figure 10:
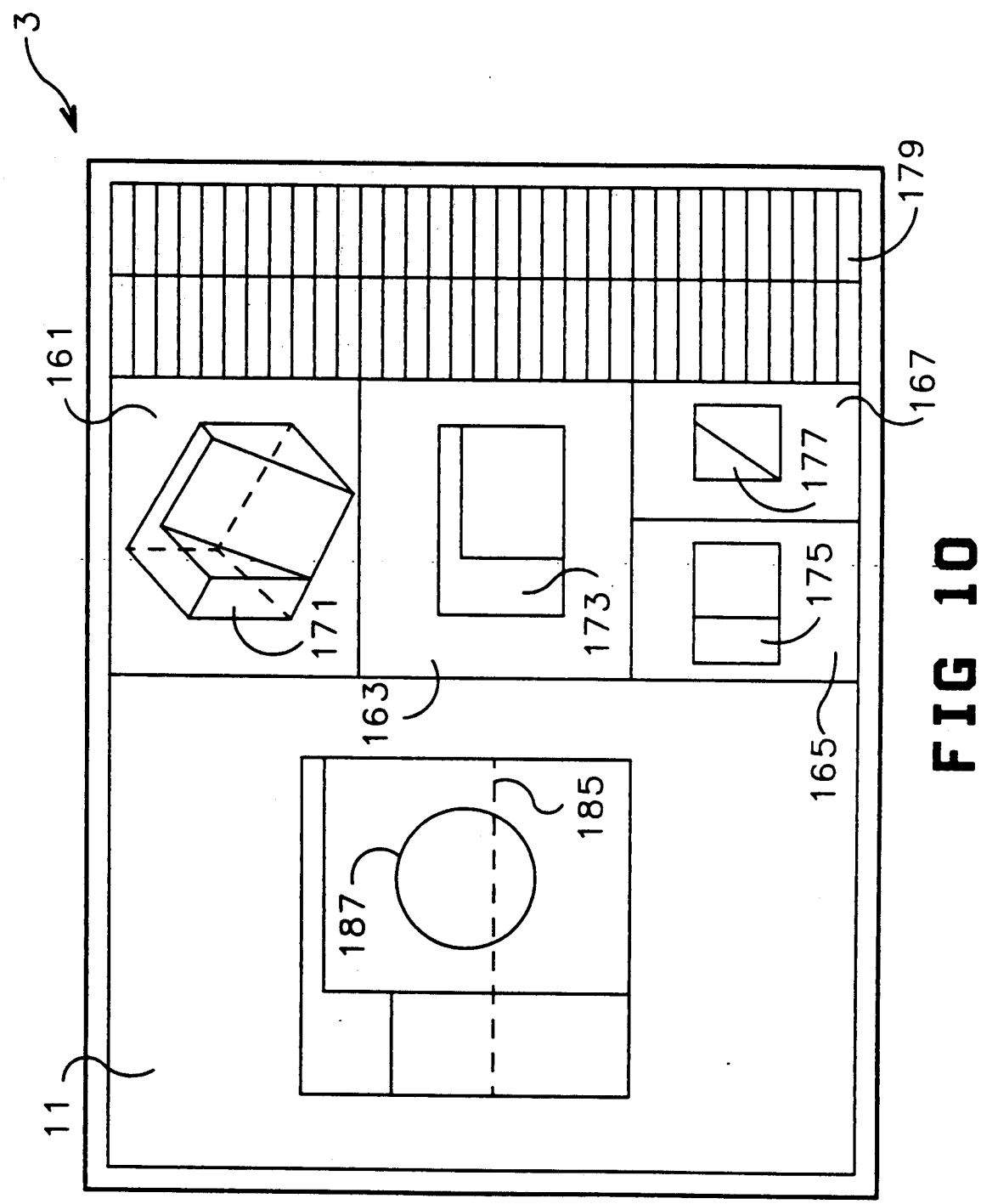
Figure 11:
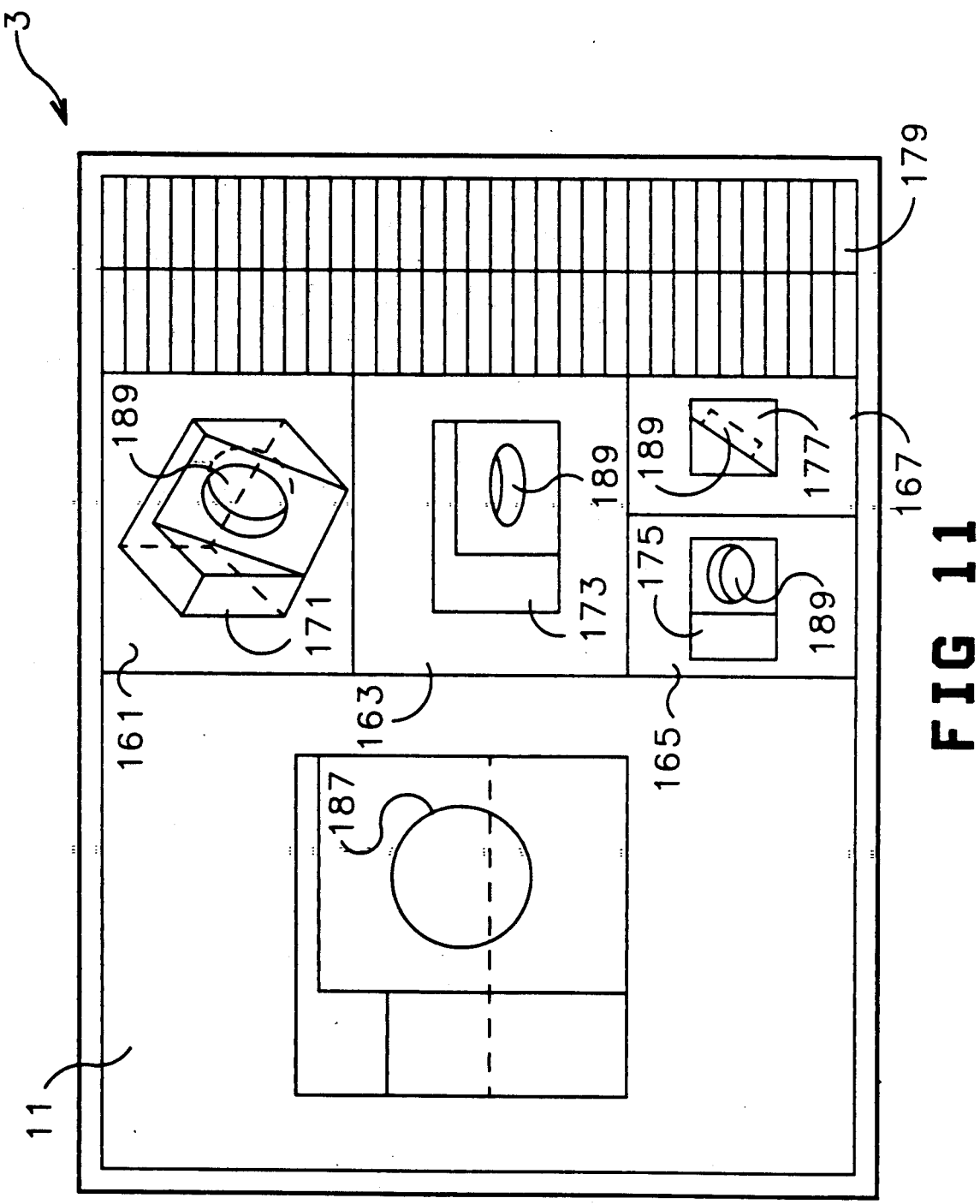

In the example shown in FIGS. 6-11, the user next decided to drill a hole in the sloping plane of the created block 171. Such an operation would be very difficult to perform in prior art systems and would consume a large amount of processor time. The system 9 easily performs this operation and the depiction of FIG. 10 is easily created.

In order to perform this drilling operation, the user first defines the sloping plane of the outbreak to be the new work plane as shown in area 11 of FIG. 10. In this work plane representation, dashed line 185 represents one of the lower edges of the block 171. Views 161-167 remain unchanged. The next step is for the user to define a circle 187 on the sloping plane which now lies in the work plane. Since the definition of the circle 187 is performed in 2D mode, views 161-167 are not affected.

After defining circle 187, the user again enters a MILL command. The MILL operation results in a hole 189 having a central axis which is at a right angle to the sloping surface of the block 171. The hole 189 can be seen best on the perspective view of area 161 but may also be seen on the other view areas in FIG. 11. In view 167 of FIG. 11, the hole 189 is only represented by a hidden line as it cannot be seen from the outside in this view. Of course, the circle 187 only appears as a true circle in the work plane and appears more or less as an ellipse in other views.

We claim:

1. An apparatus for processing a representation of a three dimensional object and for depicting the representation on a display means, comprising:
   an input device;
   determination means, coupled to the input device for receiving a command from an input device and for determining whether the command is either a 2D command or a 3D command;
   2D processing means, coupled to the determination means and selectable thereby in case that the command is a 2D command, for using the command to process the representation in a 2D mode;
   2D memory means, coupled to the 2D processing means, for storing two dimensional data regarding the object; the 2D memory means comprising; a first part which is user accessible and which is operative for receiving the 2D view information; and a second part which is not user accessible and which contains other 2D view information created by a rendering processor;
   transformation means, coupled to the determination means and selectable thereby in case that the command is a 3D command, for transforming the two dimensional data stored in the 2D memory means into a three dimensional geometry, the transformation means comprising; a profile processor for transforming 2D geometry into 3D geometry; and the rendering processor for transforming 3D geometry information into 2D view information and for storing the 2D view information in the 2D memory means;
   3D processing means, coupled to the transformation means for using the command to process the representation in a 3D mode;
   3D memory means, coupled to the transformation and 3D processing means, for storing and receiving three dimensional data regarding the object; and
   wherein the display means is coupled to the 2D and 3D memory means for displaying the representation.

2. An apparatus as in claim 1, wherein the transformation means is further operative for performing a topology check.

3. An apparatus as in claim 1, wherein the transformation means comprises:
   a profile processor for transforming 2D geometry; and
   a rendering processor for transforming 3D geometry into 2D view information and for storing the 2D view information in the 2D memory means.

4. A method for processing a representation of a three dimensional object and for depicting the representation on a display, comprising:
   receiving a command by an input device;
   determining whether the command is either a 2D command or a 3D command by a determination means;
   processing the command in a 2D mode if the command is a 2D command by a 2D processing means;
   providing a transformation means comprising; a profile processor and a rendering processor;
   transforming 2D geometry into 3D geometry using the profile processor;
   transforming 3D geometry information into 2D view information and storing the 2D view information in the 2D memory means using the rendering processor;
   automatically transforming the representation into a 3D representation if the command is a 3D command by the transformation means and then processing the command in a 3D mode by a processing means; and
   displaying the representation by a display means.

5. A method as in claim 4, further including the step of performing a topology check by said transformation means after the step of transforming the representation.

* * * * *